3,028,241
METHOD OF PRESERVING FOOD PRODUCTS FORMED OF BLOOD

Adam Christopher Ove Treschow, Johanneshus, Rogle, Sweden, assignor to "O-For," Olsson & Co., Zollikerberg, Zurich, Switzerland, a corporation of Switzerland
No Drawing. Filed June 29, 1960, Ser. No. 39,447
Claims priority, application Sweden July 7, 1959
2 Claims. (Cl. 99—21)

It has previously been proposed to preserve animal food products by fermentation with lactic acid bacteria whose natural growth medium is the green parts of plants. This is performed by grinding animal material to an aqueous pulp and mixing the latter with a suitable carbohydrate nutrient for the bacteria. The carbohydrate animal pulp mixture is then inoculated with lactic acid bacteria, and the inoculated pulp is then fermented until its pH value is not more than 4. The inoculation of the carbohydrate pulp may be performed periodically. The nutrient for the bacteria culture may be mixed with the bacteria culture before or after or both before and after the inoculation of the pulp.

Different methods of preservation are known in which the preservation is achieved by the acidification of the animal products which are to be preserved. One of these methods comprises the addition of a pure culture of lactic acid bacteria to the animal food product so that a fermentation process occurs under certain conditions, lactic acid being then produced and the pH value reduced to 4 or below. The product is then substantially sterile. These earlier procedures, however, take up considerable time and involve difficult procedures. In the first place a suitable lactic acid bacteria species must be isolated, and they must be cultivated so that they remain pure, which by itself is rather a complicated and troublesome procedure. When the isolation and cultivation is completed, other methods must be used to acclimatize the bacteria to a fish medium. When this has been done, care must not only be taken to see that the bacteria are kept alive but above all that they have a capacity for high activity and are uncontaminated by foreign bacteria. By lactic acid bacteria is meant such lactic acid bacteria which are included in the expression "growth lactic acid bacteria," that is bacteria whose natural growth medium is the green parts of plants.

In the factory where the pure culture is to be used, it must undergo a fairly laborious treatment. This comprises, inter alia, the production of a sterile nutrient substrate in which the mother culture must be multiplied in different stages.

The final culture produced in the factory constitutes a by no means insignificant part of the total factory costs.

During extensive experiments it has been proved to be possible to achieve better results so far as the final product is concerned by adding to the food substance, after it has been mixed with a carbohydrate substance suitable for lactic acid bacteria, a pulp which has been fermented with lactic acid bacteria and which is capable of developing in the mixture to produce a pH value of 4 or below.

The advantages of this method are many and significant, among them the following.

Firstly, only lactic acid bacteria are required to start a new manufacture. After it has started, fermented pulp from the current production can be used as a bacteria addition. The lactic acid bacteria necessary for initiating the manufacture can be obtained in different ways. For example, pure cultivated lactic acid bacteria may be added in the known way, but the same result may be achieved in a simple way, namely, by using liquid extract from green silage or green silage itsel. It is however best if the green food-stuff is fermented without the addition of inorganic acids or salts and whose pH value is about 4.

The lactic acid bacteria in use in the current manufacture have had more opportunity of becoming acclimatized to a fish medium than lactic acid bacteria culture produced in a factory. In the former case there is therefore obtained a more rapid and more powerful lactic acid fermentation and "wild" fermentation, initiated by foreign bacteria, is largely avoided. The wild fermentation occurs at the beginning of the process and causes loss of dry substance and decomposition of the albumen. In order to maintain the lactic acid bacteria in the fermented pulp to be used as an inoculant in the best possible condition, the pulp may be inoculated with different nutrient substrates. By adding the lactic acid bacteria to the nutrient substrate and then mixing the latter with the animal substance the activity of the lactic acid bacteria in the pulp is stimulated at the expense of the bacteria life which is of no account. In this way lactic acid bacteria obtain a favourable initial position for combatting other bacteria.

It has now been discovered that this process is particularly suitable for the production of food products formed of blood, particularly fresh blood, which can be obtained in large quantities from slaughter houses. In Sweden alone 100,000 tons of blood are wasted every year.

It is impossible, when fermenting blood by pure cultivated lactic acid bacteria alone, to avoid coagulation of the blood which forms a fairly firm, non-pumpable mass. This occurs even if the blood is treated with, for example, sodium citrate, which, as known, is used in slaughter houses to counteract coagulation. A coagulated mass of blood is undesirable from the manufacturing point of view for several reasons; one particular reason is that it is not possible to remove a coagulated mass of blood from the fermentation vessels or tanks by pump. Difficulties also arise when the more or less solid mass is to be mixed with desired additives such as bran, luzerne etc. Furthermore, animals consume blood or a blood-meal mixture with great reluctance, even when mixed with other foodstuffs, particularly if the blood constitutes a fairly large proportion of the food-stuff mixture. But if the blood product is fermented according to this invention, then it is by itself a particularly appetizing food-stuff for animals.

This good result is obtained by inoculating the blood, during the fermentation of the blood, with fish pulp fermented by lactic acid bacteria, for example obtained from the current manufacture of fermented fish pulp. This only needs to be added in small quantities to achieve the desired result. Very good results have been obtained during trials with a few percent, for example about 5% or above. Good results have, however, also been obtained with somewhat lower quantities of inoculant. The main thing appears to be that development of the bacteria culture in the right direction is ensured. The essential thing is that no coagulation of the blood pulp occurs during this method. By means of this improvement in animal food products produced by fermentation it is possible to make use of large quantities of blood, and use them for feeding animals; this not only means that a perfectly satisfactory food-stuff is obtained but also that an economic gain is achieved since it is now possible to make effective use of the large quantity of blood which is obtainable from slaughter houses and which was previously regarded as a waste product. The food product produced in this way has in addition an increased nutritive value on account of the increase which occurs in the important vitamin $B_{12}$. The quantity of amino acids is also increased. In addition to the bacterization effect, there is also a destructive effect on foot-and-mouth disease virus.

What I claim is:

1. A method of producing a food product from blood which comprises inoculating the blood with a fish pulp that has been fermented by means of lactic bacteria and fermenting the inoculated blood to a pH value of not more than 4.

2. A method as defined in claim 1 in which the blood is inoculated with about 5% of the fish pulp.

References Cited in the file of this patent

UNITED STATES PATENTS

| | | |
|---|---|---|
| 1,599,030 | Richardson | Sept. 7, 1926 |
| 2,194,672 | Porter et al. | Mar. 26, 1940 |

FOREIGN PATENTS

| | | |
|---|---|---|
| 719,629 | Great Britain | Dec. 8, 1954 |